UNITED STATES PATENT OFFICE.

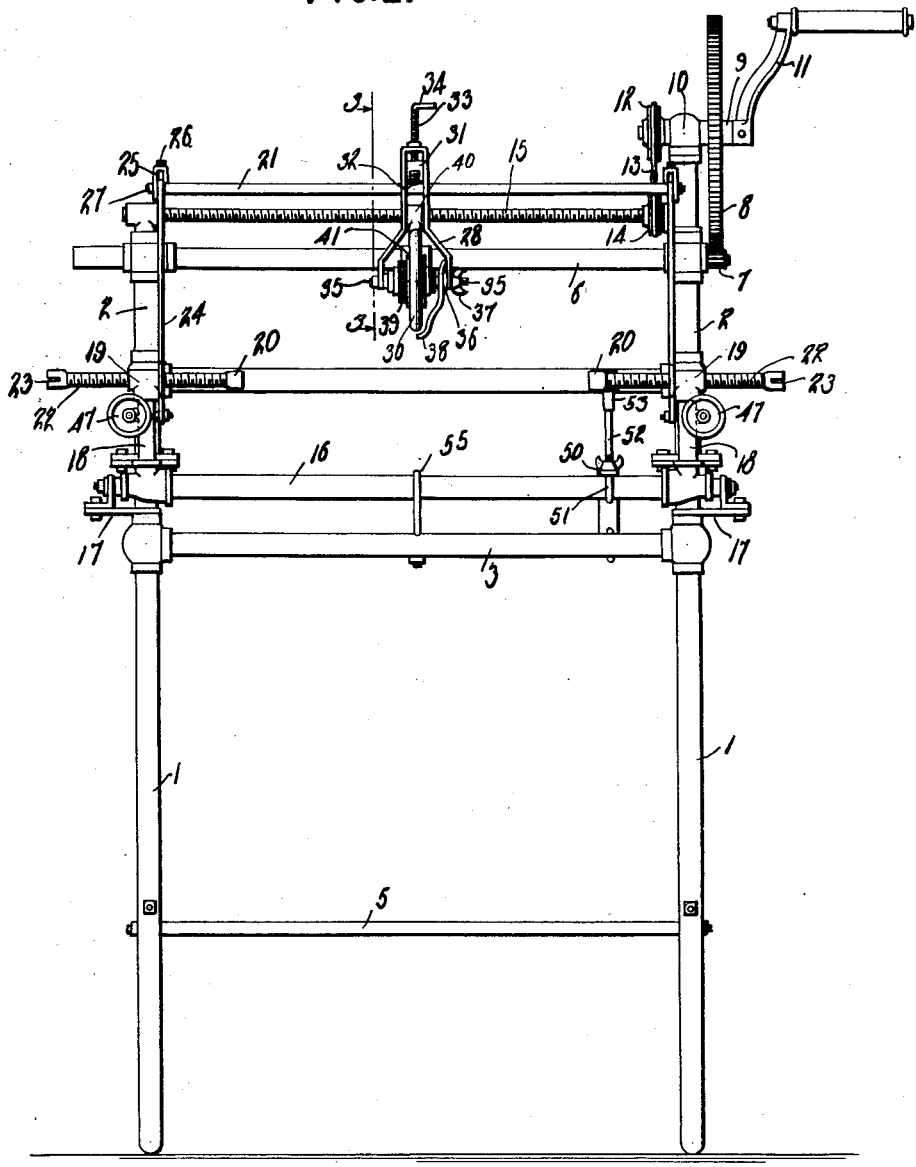

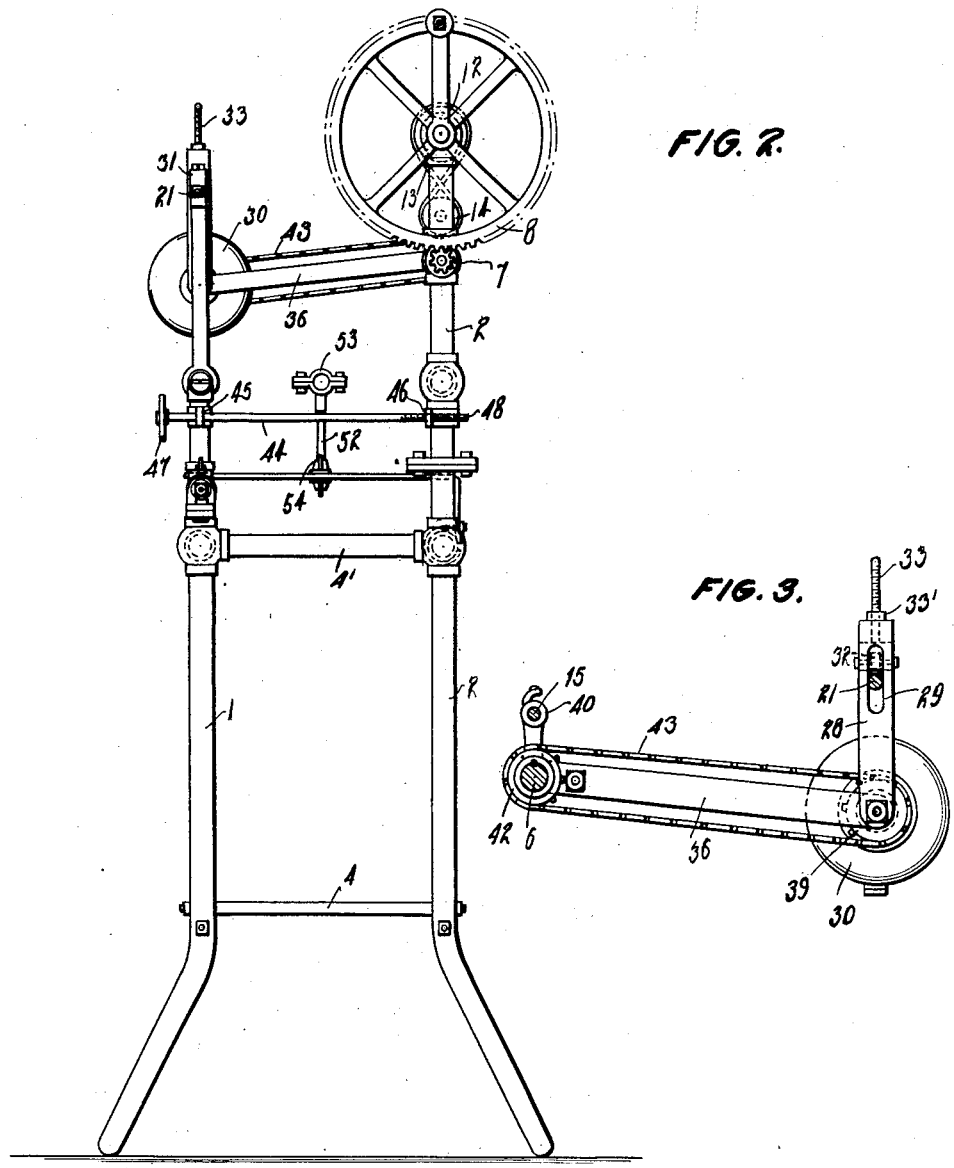

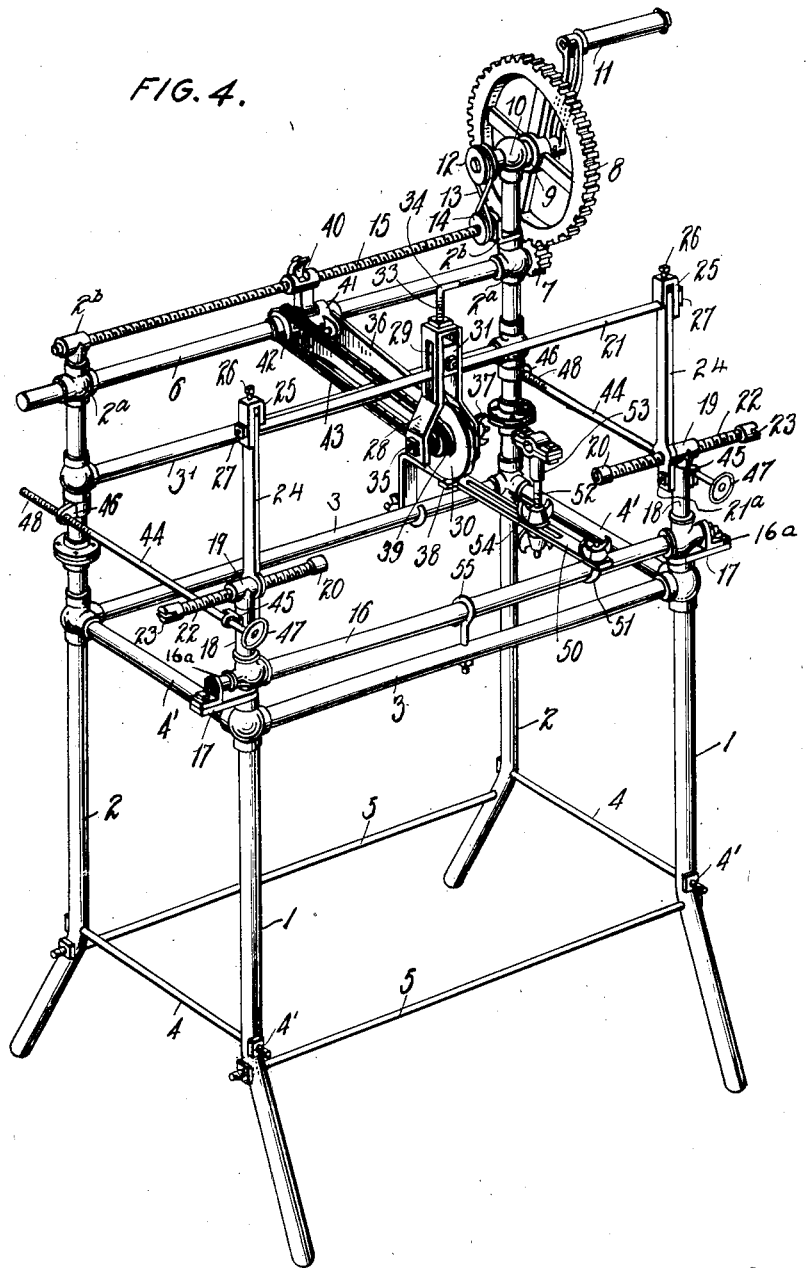

JOHN E. ANDERSON, OF JAMESTOWN, NORTH DAKOTA.

GRINDING MACHINE.

1,409,641.

Specification of Letters Patent.   Patented Mar. 14, 1922.

Application filed November 19, 1918. Serial No. 263,180.

*To all whom it may concern:*

Be it known that I, JOHN E. ANDERSON, a citizen of the United States, residing at Jamestown, in the county of Stutsman and State of North Dakota, have invented certain new and useful Improvements in Grinding Machines, of which the following is a specification.

This invention relates to grinding machines for lawn mower knives.

The object of the invention is to provide a simple and efficient machine of this character, especially adapted for grinding the cutting blades of lawn mowers without taking the mower apart except to remove the driving wheels.

Another object is to construct a machine of this character which operates with lathe like precision, and in which perfect alinement is assured between the axis of the reel and its support.

Another object is to construct a machine of this character, the grinding tool of which is adjustable relatively to the blades to be ground and which provides for centering of the work crosswise, also for running the centers over to allow the lower blade to be ground without taking it from the frame, and to insure its being ground in a straight line with the reel.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a grinding machine constructed in accordance with this invention, Fig. 2 is an end view thereof, and Fig. 3 is a transverse vertical section taken on the line 3—3 of Fig. 1.

Fig. 4 is a perspective view of the grinding machine.

In the embodiment illustrated, a supporting structure is shown in the form of a stand composed of one-inch pipe and rail fittings to produce a neat, strong, light frame presenting a good appearance. This stand or frame comprises two front standards 1 and two rear standards 2. The standards 1 and 2 are connected by cross bars 4 and side bars 5. The lower ends of said standards are bent outward or flared to afford an extended supporting base. The upper ends of the standards are connected by side and cross rails 3 and 4' as shown in Figure 4 of the drawing.

A main driving shaft 6 is supported in the upper ends of the rear standards 2 and carries at one end thereof a pinion 7 with which meshes a large driving gear 8 mounted on a drive shaft 9 supported in a suitable bearing 10 at the upper end of one of the rear standards 2. A crank handle 11 is fixed to one end of said shaft which may be manually operated or motor driven as desired. The other end of the shaft 9 carries a grooved pulley 12 to receive a belt 13 which also passes around a similar pulley 14 fixed to the feed screw 15. This feed screw or shaft 15 is mounted in suitable bearings carried by the upper ends of standards 2 and is driven by the rotation of wheel 8.

A shaft 16 is supported by trunnion 16ª pivoted to swinging brackets 17, the latter being carried by the front standards of the stand and supporting standards 18 having bearings 19 at their upper ends in which are mounted cupped center bearings 20 which are designed to receive the ends of the reel shaft thereby assuring perfect alinement with the reel axis. These cupped centers 20 are mounted on the inner ends of screws or screw rods 22 kerfed at their outer ends as shown at 23 for the insertion of a tool for adjusting said centers toward and away from each other to adapt them to accommodate reels of different lengths. Uprights 24 rise from said bearings 19 having apertures for encircling the bearings and provided at their lower ends with set screws 21ª to hold the arms upright and support at their upper ends a parallel rod or bar 21 designed as a guide or track for the grinder here shown in the form of an emery wheel 30. This bar is connected with said standards 24 by hook-shaped brackets 25 which have bolts 26 extending therethrough and engaging the upper ends of the standards 24 for adjusting the parallel bar 21 vertically, and cap bolts 27 extend through the upper ends of the standards 24 and engage the rod 21.

An inverted U-shaped yoke 28 has the arms thereof slotted longitudinally as shown at 29 to straddle the rod 21, said rod extending through the slots as is shown clearly in Fig. 3. A block 31 is arranged between the arms of the yoke and equipped with a roller 32 which travels on the bar or rod 21 thereby guiding the yoke across the machine. A threaded vertically disposed shaft 33 has threaded engagement with the upper end of the yoke as shown at 33' and carries at its lower end the block 31 having a swivelled connection therewith, so that the turning of said shaft will operate to raise or lower the yoke 28 which supports the emery wheel 30. This shaft 33 as shown, has a laterally extending handle 34 to facilitate its actuation.

A threaded bearing 40 is mounted to travel on the feed rod 15 and is connected with a sleeve 41 loosely mounted on the driving shaft 6. A sprocket wheel 42 is carried by the sleeve 41 which is splined or is keyed to shaft 6, so that the rotation of said shaft operates to drive said sprocket. Extending forwardly from the sleeve 41 are two bars 36, between which the emery wheel 30 is mounted, a shaft 35 extending through the free ends of the yoke arms, the front ends of said bars 36, and the bushing of said wheel 30, the latter being mounted on ball bearings so as to turn freely. A wing nut 37 is mounted on one end of the shaft 35 and is designed for tightening a mower blade adjustment stop 38 carried by the shaft 35 as is shown clearly in Fig. 1. This stop 38 is designed to be engaged by the blade of the mower to be sharpened which is retained in engagement therewith by pressure of the emery wheel 30 and which also operates to keep the blade up during the travel of the emery wheel across the machine, which is accomplished by the rotation of the feed screw or shaft 15.

The emery wheel 30 has a sprocket wheel 39 fixed to the hub thereof and over which a sprocket chain 43 passes, said chain also passing around the sprocket wheel 42 which is actuated by the driving shaft 6.

The proportions of the driving gear 8 and the pinion 7 are such that forty turns of the gear wheel 8 will rotate the emery wheel fifteen hundred revolutions per minute, but of course this may be varied according to the sizes of the pinion and the gear referred to.

A rod 44 extends through lugs 45 and 46 carried respectively by the standards 18 and 2 at each end of the stand. This rod 44 has an actuating wheel 47 at its front end and its rear end is threaded as shown at 48, having threaded engagement with the lug 46 and is designed for retaining the parallel bar 21 and the center frame in parallelism with the screw 15 and also for adjusting centers 20 relative to the grinding wheel to provide for grinding of the lower plate of the mower. It is to be understood that two of these rods are provided, one at each end of the frame as is shown clearly in Fig. 1.

A sliding adjustable bracket 50 is carried by shaft 16 and the rear bar 3 of the stand, being connected with said shaft and bar by means of U-shaped hanger bolts as 51. This slidable adjustable bracket is provided with a clamp extension for holding the mower frame in any position desired. This extension comprises a standard 52 having a clamp 53 at its upper end. This standard 52 is adjustably mounted on the bracket 50 and held in adjusted position by a thumb nut 54. A hooked bolt 55 is carried by the bar 3 and is engaged with a shaft 16 to prevent springing of said shaft under tension.

In the use of this grinding machine, when a lawn mower is to be operated on, the driving wheels thereof are removed and the ends of the reel shaft are inserted in the cupped centers 20 said centers having been first adjusted a proper distance apart to receive said reel shaft. This bolt would be unhooked from the shaft 16 during the adjustment of the latter as effected by the manipulation of the actuating wheel 47.

The clamp carried by the standard 52 holds the mower in position for the blades to be actuated on by the emery wheel 30.

When the parts are in this position, the crank handle 11 is turned, thereby rotating the feed shaft 15 and the main shaft 6 which causes the emery wheel to travel across the machine and simultaneously to be rotated.

The connected standards 18 which carry the parallel bar 21 swing on trunnion bearings 16ª which provides for centering of the work crosswise, and also for swinging the centers 20 over a sufficient distance to permit the lower blade of the mower to be ground without removing the blade from the frame, and at the same time, the lower blade is ground in a straight line with the reel which is an important feature of the invention.

The foregoing description and the drawings have reference to what may be considered the preferred or approved form of my invention. It is to be understood that I may make such changes in construction and arrangement and combination of parts, materials, dimensions, etc., as may prove expedient and fall within the scope of the claimed invention.

Having thus fully described my invention, what I claim as new and desire to secure by Letters Patent, is:—

1. A grinding machine having a frame, a pair of opposed centers mounted on said frame, arms mounted on the centers and extending upward therefrom, a cross bar connecting the upper ends of said arms, a shaft journalled at the rear of said frame, an arm pivoted on said shaft and extending forwardly therefrom, a yoke carried by said last mentioned arm and having its bight portion extending upwardly therefrom, the sides of said yoke adjacent its top being slotted and having the bar extending therethrough, a grinding wheel supported in the lower end of said yoke, a sliding block in the upper end of said yoke resting on said bar, an adjusting screw passing through the bight portion of the yoke and bearing on said block, and means to drive the grinding wheel from the shaft.

2. A grinding machine having a frame, a pair of opposed centers mounted on said frame, arms mounted on the centers and extending upward therefrom, a cross bar connecting the upper ends of said arms, a shaft journalled at the rear of said frame, an arm pivoted on said shaft and extending forwardly therefrom, a yoke carried by said last mentioned arm and having its bight portion extending upwardly therefrom, the sides of said yoke adjacent its top being slotted and having the bar extending therethrough, a grinding wheel supported in the lower end of said yoke, a sliding block in the upper end of said yoke resting on said bar, an adjusting screw passing through the bight portion of the yoke and bearing on said block, means to drive the grinding wheel from the shaft and other means to traverse said yoke and block along said bar.

In testimony whereof I affix my signature in presence of two witnesses.

JOHN E. ANDERSON.

Witnesses:
 JOHN JORGENSON,
 R. M. BOLTON.